July 7, 1970  A. J. GRANBERG  3,518,882
POSITIVE DISPLACEMENT LIQUID METER
Filed Jan. 24, 1966  2 Sheets-Sheet 1

INVENTOR
ALBERT J. GRANBERG
BY
Charles O. Bruce
ATTORNEY.

July 7, 1970 A. J. GRANBERG 3,518,882
POSITIVE DISPLACEMENT LIQUID METER
Filed Jan. 24, 1966 2 Sheets-Sheet 2
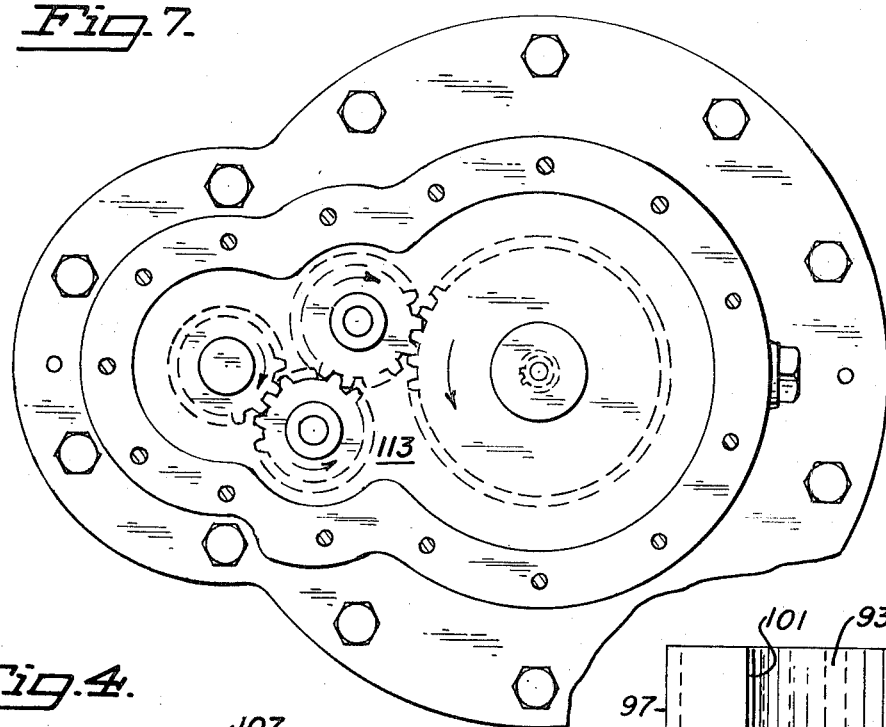
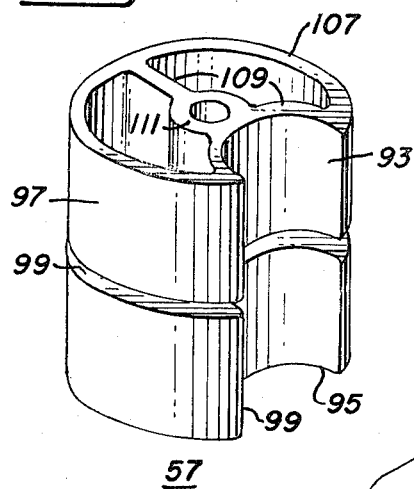
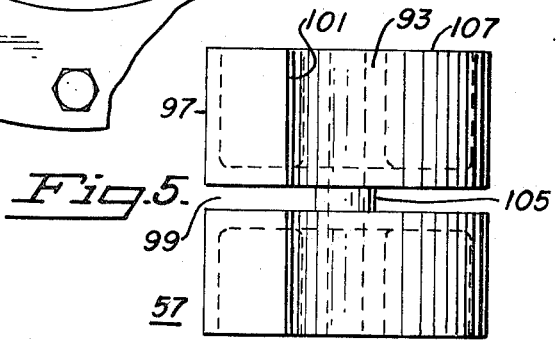
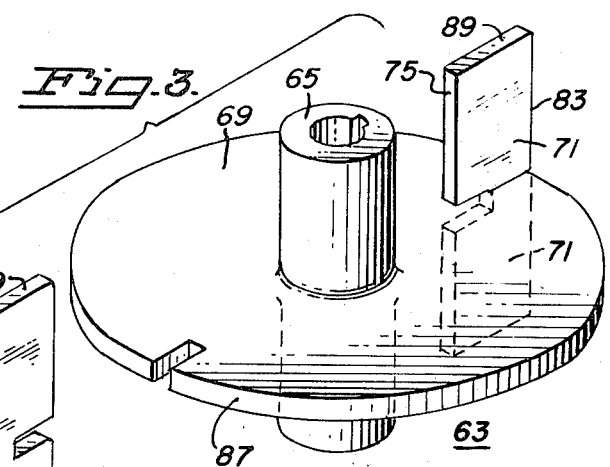
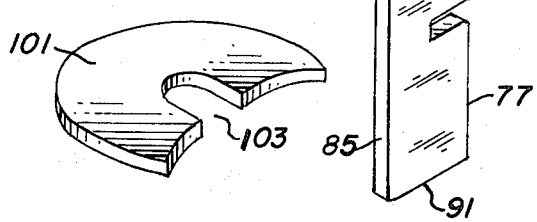
INVENTOR
ALBERT J. GRANBERG
BY
Charles O. Bruce
ATTORNEY

United States Patent Office 3,518,882
Patented July 7, 1970

3,518,882
POSITIVE DISPLACEMENT LIQUID METER
Albert J. Granberg, 6001 Rockwell St.,
Oakland, Calif. 94618
Filed Jan. 24, 1966, Ser. No. 522,480
Int. Cl. G01f 3/08
U.S. Cl. 73—253                  3 Claims

ABSTRACT OF THE DISCLOSURE

An apparatus for the measurement of liquid flow rates and utilizing a vaned rotor having a centrally disposed flange supporting vertically disposed rotor vanes. An escapement rotor having a concavity for receiving the vanes of the vaned rotor continuously seals between the inlet and outlet ports of the measuring chamber of the meter.

BACKGROUND OF THE INVENTION

Field of the invention

This invention relates to liquid meters. More particularly it relates to a positive displacement liquid meter utilizing a flow driven vaned rotor and a gear driven escapement rotor mounted within a generally cylindrical meter housing.

Description of the prior art

Many types of positive displacement meters have been devised for the purpose of measuring the flow of liquid products. In general, a vaned rotor is driven by the flow of liquid passing through the meter and a counter is in turn driven by that rotor for recording the volume of flow. The rotors have usually been quite different in each of the meters which have heretofore been tried and have produced a wide range of degrees of accuracy and reliability.

The basic problem in devising any vaned type meter lies in providing a seal for the return side of the meter. This is between the inlet and outlet ports. During operation, this seal must permit the rotor vanes to pass from the outlet to the inlet side of the meter. In some meter designs, the rotating vanes themselves create the seal between the ports. A meter of this type is described and illustrated in U.S. patent application, S.N. 454,573, filed May 10, 1965, by the present inventor, Albert J. Granberg. In other meter designs, an escapement mechanism is used to provide the seal between the ports and to permit the rotor blades or vanes to pass between them on the return side of the meter. A meter of this type is described and illustrated in U.S. patent application, S.N. 492,639, filed Oct. 4, 1965, by the present inventor, Albert J. Granberg.

In order to prevent leakage of flow within the meter, and bypassing of flow between the inlet and outlet ports, two critical seals must be effected. First, the primary, or counting rotor, must be effectively sealed with the interior walls of the meter casing to insure that the liquid passes through the meter with positive displacement characteristics thereby turning the rotor proportional to the rate of flow. Second, a rotating escapement seal must also be provided to prevent the liquid from bypassing directly from the inlet port to the outlet port while permitting the rotor vanes or blades to pass through the seal.

In some meters, the configuration of the chamber formed between the rotor blades changes as the rotor turns thereby changing the volume of the chamber. A predetermined amount of leakage is necessary in this type of meter to prevent lockups at higher rotational speeds of the primary rotor. Unfortunately, this leakage rate is not constant over the speed range of operation and produces inaccuracies. Therefore, a meter which does not require a built-in leakage rate is a necessity for accurate flow measurement. The present invention overcomes this problem and provides novel means of effecting the critical seals.

SUMMARY OF THE INVENTION

The present invention effects the solution to the many problems in the art of liquid measuring devices and provides an accurate and efficient positive displacement rotary vaned meter. Briefly, it comprises a meter housing defining an interior chamber having inlet and outlet ports disposed on opposite sides of the housing; upper and lower end cover plates are provided sealed to the housing with generally cylindrical skirts projecting into the chamber; a vaned rotor is journalled in the end cover plates and has a flange disposed between and sealing with the skirts on the end cover plates; a multiplicity of vanes are secured to the periphery of the flange sealing with the meter housing and the end cover plates; a generally cylindrical escapement rotor is journalled in the end cover plates intermeshing with the vaned rotor and continuously seals with the end cover plates, the skirts, and the housing, preventing flow of liquid directly from the inlet to the outlet port, and has at least one concave portion along the cylindrical face thereof; escapement rotor driving means are provided for rotating the escapement rotor realtive to the vaned rotor whereby during operation each of the rotor vanes is enclosed in the concave portion of the escapement rotor while travelling between the outlet and inlet ports; and, a flow recording means is driven by one of the rotors.

OBJECTS OF THE INVENTION

It is therefore an important object of the present invention to provide a liquid flow meter which is of the positive displacement type for accurate measurement of the flow of liquid.

Another object of the present invention is to provide a liquid flow meter in which a novel escapement mechanism is utilized to seal between the inlet and outlet ports on the return side of the meter to prevent short cutting and leakage of the liquid flow within the meter.

A further object of the present invention is to provide a new and novel liquid flow meter for measuring volatile fluids, petroleum products and other oils.

It is yet another object of the present invention to provide a liquid flow meter which is accurate and reliable over a large range of flow rates.

It is still a further object of the present invention to provide a liquid flow meter which has a geometrically balanced design of the operating parts in the flow measuring chambers.

Other objects and advantages of the present invention become apparent when the flow meter is considered in conjunction with the accompanying drawings.

DESCRIPTION OF THE DRAWINGS

FIG. 3 is a perspective view of the vaned rotor of the liquid flow meter of the present invention;

FIG. 4 is a perspective view of the escapement rotor of the liquid flow meter of the present invention;

FIG. 5 is a side elevation of the escapement rotor;

FIG. 6 is a perspective view of the disc which is associated with the escapement rotor;

FIG. 7 is a plan view of the gear transmission means of the liquid flow meter of the present invention.

DESCRIPTION OF THE PREFERRED EMBODIMENT

Figure 1:
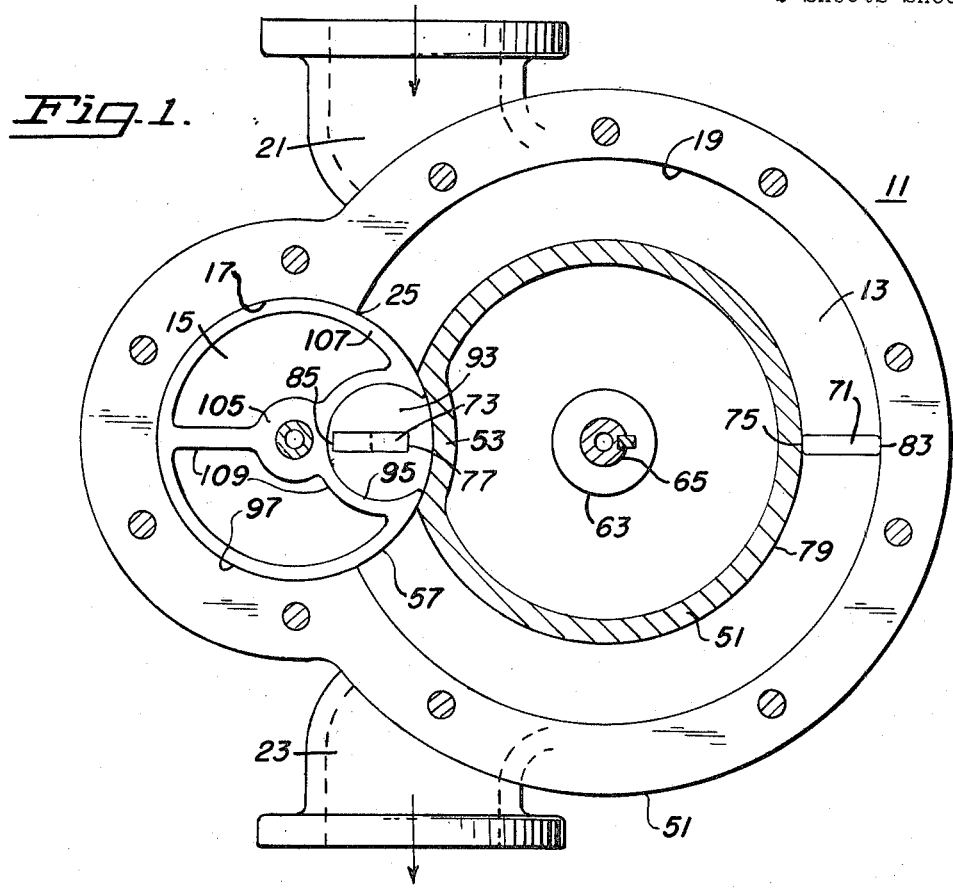
FIG. 1 is a sectional plan view of a preferred embodiment of the liquid flow meter of the present invention.
Figure 2:
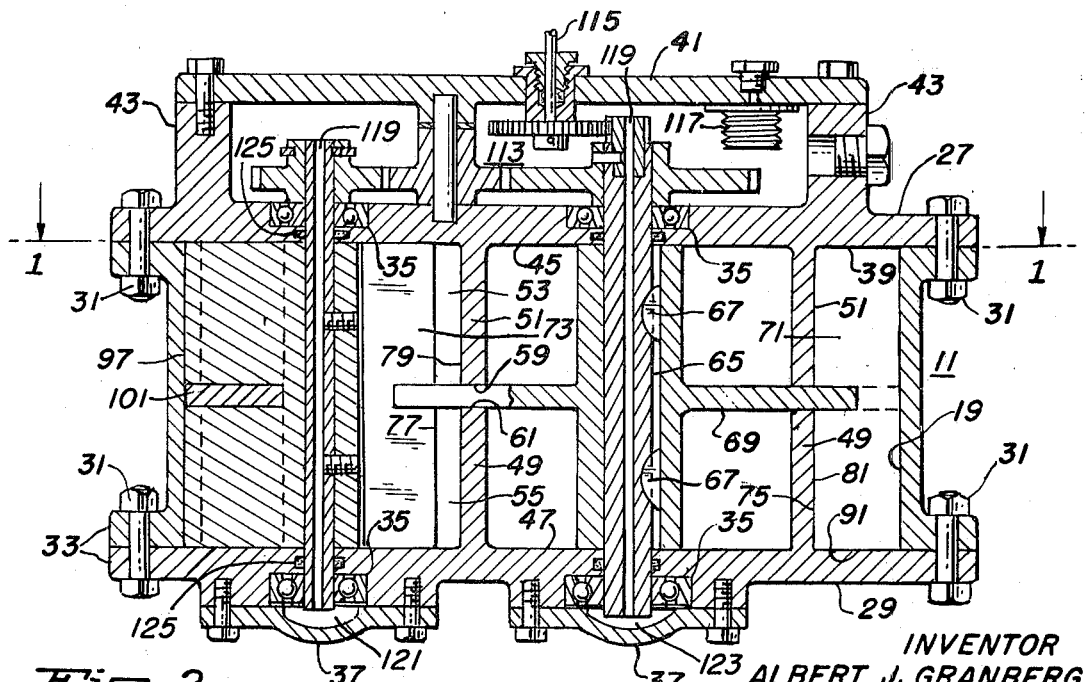
FIG. 2 is a side elevation in section of the liquid flow meter taken along lines 2—2 of FIG. 1.

Reference is made to the drawings for a detailed description of a preferred embodiment of the invention. FIG. 1 presents the basic structure of the invention. The meter housing 11 defines an interior chamber of uniform cross section which can be defined as a pair of overlapping different sized circles. Alternatively the interior chamber can be considered as a pair of intermeshed parallel cylindrical chambers 13, 15 of different diameters. The interior chamber defines a wall which is a continuous wall of adjoining partially cylindrical wall sections 17, 19.

Inlet and outlet ports 21, 23 are disposed on opposite sides of the housing and communicate therethrough with the larger of the cylindrical chambers 13 or that portion of the housing developed by the larger of the overlapping cross-sectional circles. The ports are located adjacent the smaller cylindrical chamber 15 near the intersection 25 of the chambers. The passages of the ports are formed to direct the entering and the egressing fluid flow in a streamlined path generally tangential to the internal surface of the larger cylindrical chamber wall section.

The ends of the meter housing are formed for mating with upper and lower end cover plates 27, 29. These plates are secured to the housing in the preferred embodiment by means of bolts 31 and flanges 33. The plates can be sealed to the housing by O-rings or other compressible type seals. The end cover plates are formed for supporting rotating shaft bearings 35 and containing lubricant for them. This is done by means of shaft end cover caps 37 on the lower end of the meter and by a cover plate 41 which secures to the retaining walls 43 formed on the upper end cover plate 27.

The interior sides 45, 47 of the end cover plates have inward projecting generally cylindrical skirts 49, 51. Both of the skirts are indented along one side parallel the cylindrical axis of the skirts. The indentations form cylindrical concave surface sections 53, 55 having a circle of generation the diameter of the escapement rotor 57 which is disposed in the smaller of the housing chambers 15. The skirts are of equal size and are concentrically disposed in the larger of the cylindrical chambers with the concave section being aligned in opposing relation and sealing with the escapement rotor. The innermost ends 59, 61 of the skirts are formed parallel the end cover plates and effect opposing planar sealing surfaces disposed in spaced relation to each other.

A rotor 63, having a hollow shaft 65 journalled in the end cover plates, is concentrically disposed in the larger of the housing chambers 13. The rotor is keyed 67 to the hollow shaft and has a perpendicularly extending circular flange 69 intermediate thereof. The flange is disposed to rotate horizontally between the opposing planar sealing surfaces 59, 61 of the skirts and seal with the wall 19 of the chamber. FIG. 3 of the drawings is an exploded view of this rotor showing the manner in which it is constructed.

In the preferred embodiment, the rotor has two rectangular vanes 71, 73 secured to the flange at diametrically opposed positions on the periphery thereof. The vanes are perpendicular to the flange and are formed with their radially innermost vertical edges 75, 77 sealing with the outer cylindrical surfaces 79, 81 of the skirts. The radially outer vertical edges 83, 85 of the vanes are arranged flush with the peripheral edge 87 of the flange and seal with the wall 19 of the larger cylindrical chamber. The upper and lower edges 89, 91 of the vane seal with the upper and lower end cover plates 27, 29 respectively.

The aforementioned escapement rotor 57 is generally cylindrical and is journalled in the end cover plates. It is concentrically disposed within the smaller of the cylindrical chambers 15 in sealing relation with the wall 17 thereof. The rotor has a partially cylindrical concave portion 93 defining an interior wall 95 subtending an angle of revolution of approximately 260 degrees. This concave portion 93 is parallel the cylindrical axis of the rotor and is located in the generally cylindrical surface 97 thereof. The angle of revolution of 260 degrees, which has been found to be proper for a meter of the proportions shown in the attached figures, will vary considerably if different proportions are used for the sizes of the two rotors. The angle of revolution can be varied without adverse effect so long as the proper continuous sealing relation is maintained between the escapement rotor and the skirts of the end cover plates and the proper insertion and retraction of the vanes within the concave portion of the escapement rotor can be effected.

For proper sealing of the escapement rotor with the skirts, it is necessary that a portion of the cylindrical external surface 97 of the escapement rotor be in sealed relation with the concave sections 53, 55 of the skirts at all times. This provides a continuous positive seal between the inlet and outlet ports preventing shortcutting by the liquid directly to the outlet port.

The escapement rotor seals at its upper and lower ends with the end cover plates and has a radial groove 99 cut intermediate the cylindrical length thereof level with the flange 69 of the vaned rotor. The rotors are spaced so that the flange projects into the groove and effects a sealed intermeshing of the vaned rotor with the escapement rotor.

A moon-shaped slotted disc means 101 is disposed in the groove for sealing against leakage directly from the inlet port to the outlet port through the groove. The slot 103 of the disc straddles the shaft 105 of the rotor. The periphery 87 of the vaned rotor flange rotates in the groove of the escapement rotor against the moon-shaped disc 101 holding it in position.

In order to make the escapement rotor lightweight, it is formed with a peripheral shell 107 which defines the cylindrical external surface 97 thereof. The shell is supported by a web structure 109 which extends from the central core or shaft 105 and supports the external shell 107. The web structure actually forms the wall 95 of the concave section.

A gearing means 113 is provided for driving the escapement rotor at twice the angular velocity of the vaned rotor. Thus each of the rotor vanes 71, 73 is enclosed while traversing from the outlet to the inlet port in the concave portion 93 of the escapement rotor as the meter operates. The escapement transports each successive blade of the vaned rotor as it passes between the inlet and the outlet ports without permitting liquid to backflow directly from the inlet to the outlet port through the escapement mechanism. The provisions for the groove in the escapement rotor and the intermeshing of the cylindrical chambers in the housing permit the rotors to intermesh and rotate without mechanical interference.

A liquid flow recording means is driven by the gearing system of the rotors. An output shaft 115 is geared to the end of one of the rotor shafts and is connected outside the meter with a standard mechanical counter. The output shaft passes through the wall of the end cover plate by means of a packing gland 116. The counter is driven at a speed which is adjusted by gearing so as to record the actual volume of flow passing through the meter.

In the arrangement of the working relation of the parts of the preferred embodiment of the invention, the housing 11 can be divided into quadrants. The inlet 21 and outlet 23 ports are disposed in two adjacent quadrants for communicating through the housing wall with the interior chamber 13. The escapement rotor 57 is disposed in the smaller cylindrical chamber 15 between the ports located symmetrically on the adjacent quadrants division line. A partitioned generally semicircular passage is formed opposite the escapement rotor between the end cover plates 27, 29, the housing wall 19 and the end cover skirts 49, 51. The compartment extends in a semicircle of generation greater than 180 degrees. This is so that both of the rotor vanes 71, 73 can be sealing the passage simultaneously during a portion of each one-half revolution of the vaned rotor to intermittently lock off a measured quantity of fluid. The intermittent sealing of the compartment provides the positive displacement characteristic of the meter.

The vanes 71, 73 of the rotor seal with the end cover plates 27, 29, the wall of the housing 19, and the end cover skirts 49, 51 by having a close tolerance fit with the sealing surface of each of these elements. The close mating of the parts permits a slidable sealing relation which effectively prevents leakage. If more than two vanes are provided on the vaned rotor, the passage can be of a lesser angle of generation than 180 degrees, but the passage must extend around the interior wall sufficiently far to always permit one blade to seal it continuously and every two successive blades to seal it simultaneously.

In operation, liquid enters into the meter through the inlet port and is directed in a path tangential to the interior walls of the larger cylindrical chamber of the housing. The flow is divided by the flange of the vaned rotor and is trapped between the skirts of the end cover plates and the wall of the larger chamber. In travelling around to the outlet port, a measured quantity of liquid impells the vanes of the vaned rotor. As the quantity of liquid egresses through the outlet port, a vane enters the concave portion of the escapement mechanism and the other blade or vane seals the tangential passage between the ports and is carried around to the escapement mechanism.

More than two vanes can be used on the vaned rotor flange if the escapement rotor is driven at a higher rate of angular velocity relative to the vaned rotor or if additional concave sections are provided in the cylindrical surface of the escapement rotor. With large capacity meters, one or both of these modifications might be made to the preferred embodiment of the invention to provide more sealed compartments and more seals between the inlet and outlet ports to keep leakage at a minimum.

A bellows 117 is provided to accommodate changes in temperature and pressure in the lubrication retaining chamber.

A separate lubricant is contained in the structure of the upper end cover plate between the retaining walls and the cover plate, the latter of which is secured to the former by any appropriate means. Bolts are used in the embodiments shown. The lubricant circulates by means of the hollow passage 119 in the shafts of the two rotors to the cavities 121, 123 created by the end cover caps which are secured to the lower end cover plates. This permits lubrication of the bearings on both ends of the shafts. Seals 125 on the shafts prevent the lubricant from penetrating into the meter and contaminating the liquid passing therethrough.

The meter is constructed with a lightweight skeleton type vaned rotor and a generally hollow escapement rotor in order to provide rotors of low weight whereby only a small amount of energy is required to drive the meter. This permits a meter which creates only a very small pressure drop when it is integrated in a liquid handling system. There are other advantages to this liquid meter, such as: The design permits the seals between the moving parts to be relatively frictionless since there need be no metal contact for creating the seals; as mentioned, the rotating parts have a very low weight, which keeps at a minimum the amount of energy required to drive the meter and thereby lowering the pressure drop across the meter; and, the meter can be easily disassembled and reassembled, or adjusted, by virtue of its simple effective construction.

It will be apparent from the foregoing description of the invention, in its preferred form, that it will fulfill all of the objects attributable thereto. While it has been illustrated and described in considerable detail, the protection is not to be limited to such details as have been illustrated and described, except as may be necessitated by the appended claims.

I claim:

1. A positive displacement liquid meter comprising
   a meter housing defining a pair of intermeshed parallel cylindrical chambers of different diameter having continuous adjoining partially cylindrical interior wall sections,
   upper and lower end cover plates sealed to said housing at the ends of said cylindrical chambers and having generally cylindrical skirts projecting into the larger of said chambers concentric therewith, said end cover plates being adapted for supporting rotating shafts,
   inlet and outlet ports disposed on opposite sides of said housing and communicating therethrough with the larger of said cylindrical chambers proximate the smaller cylindrical chamber,
   a hollow rotor shaft journalled in said end cover plates disposed in and concentric to the larger of said chambers and having a circular flange perpendicularly secured intermediate said shaft sealing with the inwardly projecting skirts of said end cover plates,
   two rectangular vanes secured perpendicularly to said flange at diametrically opposed positions on the periphery thereof, said vanes sealing with the wall of said chamber, said skirts and said end cover plates,
   a generally cylindrical escapement rotor mounted on a hollow shaft journalled in said end cover plates and concentric to and disposed in the smaller of said cylindrical chambers in continuous sealing relation with the walls thereof said skirts and said end cover plates preventing liquid from flowing directly from said inlet to said outlet port and having a partially cylindrical concave portion extending the length of the cylindrical surface thereof,
   a first sealed lubricating fluid reservoir at one end of said meter enclosing the adjacent ends of said rotor shafts and at least a second sealed lubricating fluid reservoir enclosing the opposite ends of said shafts from said first reservoir and communicating with said first reservoir through the passages formed in said hollow shafts,
   gearing means for driving said escapement rotor at twice the angular velocity of said rotor shaft whereby each of said rotor vanes is enclosed in the concave portion of said escapement rotor while travelling between the outlet and the inlet ports, and
   liquid flow recording means engaged with one of said rotor shafts and driven thereby.

2. A positive displacement liquid meter comprising
   a meter housing defining a pair of intermeshed parallel cylindrical chambers of different diameter having continuous adjoining partially cylindrical wall sections and an escapement rotor disposed in the smaller of said chambers,
   upper and lower end cover plates adapted for mating with said housing at the ends of said cylindrical chambers and for supporting rotating shaft bearings and containing lubricant for said bearings, said end cover plates having inward projecting generally cylindrical skirts indented along one side thereof parallel the cylindrical axis of said skirts forming a cylindrical concave surface section having a circle of generation the diameter of said escapement rotor, said skirts being of equal size and concentrically disposed in the larger of said cylindrical chambers with said concave sections being aligned opposite and facing the smaller cylindrical chamber, said skirts forming opposing planar sealing surfaces disposed in spaced relation to each other,
   means for securing and sealing said end cover plates to said housing,
   inlet and outlet ports disposed on opposite sides of said housing communicating therethrough with the larger cylindrical chamber adjacent the smaller cylindrical chamber, a rotor having a hollow shaft journalled in said end cover plates concentric the larger of said chambers and having a circular flange perpendicularly secured intermediate said shaft between and sealing with said opposing planar sealing surfaces of said skirts and sealing with the wall of said chamber, said flange having two rectangular radial vanes secured to said flange at diametrically opposed positions on the periphery thereof perpendicular thereto, said vanes formed for having their radially innermost vertical edges sealing with the outer surface of the cylindrical portions of said skirts and the outer radial vertical edges flush with the peripheral edge of said flange and sealing with the wall of the larger of said chambers and the upper and lower edges sealing with said upper and lower end cover plates respectively, said escapement rotor of generally cylindrical configuration and mounted on a hollow shaft journalled in said end cover plates and concentrically disposed inside said smaller chamber in sealing relation with the walls thereof and having a partially cylindrical concave portion of said rotor parallel the cylindrical axis defining an interior wall subtending an angle of revolution of approximately 260 degrees, said cylindrical rotor sealing at its upper and lower ends with said end cover plates and having a radial groove cut intermediate the cylindrical length thereof level with said flange whereby said flange intermeshes and seals with said escapement rotor in said groove, said rotor continuously sealing with said skirts of said end cover plates and preventing liquid from flowing directly from said inlet to said outlet port, a generally moon-shaped slotted disc means disposed in said groove for sealing said escapement rotor against leakage, a first sealed lubricating fluid reservoir disposed in one of said end cover plates enclosing the adjacent ends of said rotor shafts and at least a second sealed lubricating fluid reservoir disposed in the other of said end cover plates enclosing the opposite ends of said rotor shafts, said reservoirs communicating through the passages formed in said hollow shafts, gearing means for driving said escapement rotor at twice the angular velocity of said vaned rotor whereby each of said rotor vanes is enclosed in the concave portion of said escapement rotor while travelling between the outlet and inlet ports, and liquid flow recording means engaged with one of said rotor shafts and driven thereby.

3. In a liquid meter having rotors supported by shafts journalled at their opposite ends, a lubrication system comprising a first sealed fluid reservoir at one end of said meter enclosing the adjacent ends of said shafts, and at least one sealed fluid reservoir at the opposite ends of said shafts from said first reservoir and communicating therewith by means of passages extending through said shafts.

References Cited

UNITED STATES PATENTS

| | | | |
|---|---|---|---|
| 912,549 | 2/1909 | Fagan | 230—150 |
| 940,587 | 11/1909 | Fagan | 230—150 |
| 175,659 | 4/1876 | Button | 91—81 |
| 902,225 | 10/1908 | Friend | 91—81 |
| 3,188,863 | 6/1965 | Buchler | 73—261 |
| 3,304,781 | 2/1967 | Stevenson | 73—253 |
| 2,766,081 | 10/1956 | Wiedemann | 184—6 |
| 2,945,378 | 7/1960 | Martin | 73—516 |

FOREIGN PATENTS

| | | |
|---|---|---|
| 237,964 | 3/1962 | Australia. |

JAMES J. GILL, Primary Examiner